(12) United States Patent
Ambros

(10) Patent No.: US 10,274,002 B2
(45) Date of Patent: Apr. 30, 2019

(54) SELF-TAPPING SCREW AND SCREWED FASTENING AS WELL AS BLANK FOR MANUFACTURING THE SCREW

(71) Applicant: Baier & Michels GmbH & Co. KG, Ober-Ramstadt (DE)

(72) Inventor: Olaf Ambros, Biblis (DE)

(73) Assignee: BAIER & MICHELS GMBH & CO. KG, Ober-Ramstadt (DE)

( * ) Notice: Subject to any disclaimer, the term of this patent is extended or adjusted under 35 U.S.C. 154(b) by 263 days.

(21) Appl. No.: 14/843,664

(22) Filed: Sep. 2, 2015

(65) Prior Publication Data
US 2015/0377273 A1 Dec. 31, 2015

Related U.S. Application Data

(63) Continuation of application No. 13/877,635, filed as application No. PCT/EP2012/062880 on Jul. 3, 2012, now Pat. No. 9,157,467.

(30) Foreign Application Priority Data

Jul. 5, 2011 (DE) .......................... 10 2011 078 686

(51) Int. Cl.
| | | |
|---|---|---|
| *F16B 25/00* | (2006.01) | |
| *F16B 35/04* | (2006.01) | |
| *F16B 25/10* | (2006.01) | |

(52) U.S. Cl.
CPC ...... *F16B 25/0042* (2013.01); *F16B 25/0021* (2013.01); *F16B 25/0047* (2013.01);
(Continued)

(58) Field of Classification Search
CPC .............. F16B 25/0042; F16B 25/0021; F16B 25/0047; F16B 25/10; F16B 35/041
(Continued)

(56) References Cited

U.S. PATENT DOCUMENTS

| | | |
|---|---|---|
| 951,437 A | 3/1910 | Gehrke |
| 2,167,558 A | 7/1939 | Upson |

(Continued)

FOREIGN PATENT DOCUMENTS

| | | |
|---|---|---|
| DE | 102007010221 A1 | 9/2008 |
| DE | 102009025222 A1 | 12/2010 |

OTHER PUBLICATIONS

International Search Report for PCT/EP2012/062880, European Patent Office, dated Oct. 12, 2012.

*Primary Examiner* — David Sample
*Assistant Examiner* — Mary I Omori
(74) *Attorney, Agent, or Firm* — Mannava & Kang, P.C.; Adesh Bhargava

(57) ABSTRACT

A thread-forming screw comprising, at least in part, a shaft (1.1) provided with a screw thread (2) and further comprising a screw tip (1.2) at one end of the shaft (1.1), wherein the shaft (1.1) comprises a thread-forming screw-threaded portion (4) that extends away from the screw tip (1.2) and an adjoining load-bearing screw-threaded portion (3), wherein the load-bearing screw-threaded portion (3) has a round cross-section, characterized in that the load-bearing screw-threaded portion (3) displays, in the direction away from the screw tip (1.2), an increase d in a flank diameter DF and/or an outside diameter DA of the screw thread at a gradient of from 1:50 to 1:500 based on a length LG of the load-bearing screw-threaded portion (3), preferably at a gradient DA or DF to LG of from 1:100 to 1:400, wherein the increase d in the flank diameter DF and/or the outside diameter DA remains constant over the length LG of the load-bearing portion.

7 Claims, 4 Drawing Sheets

(52) U.S. Cl.
CPC .......... *F16B 25/0078* (2013.01); *F16B 25/10* (2013.01); *F16B 35/041* (2013.01)

(58) Field of Classification Search
USPC ........................................................ 428/577
See application file for complete search history.

(56) References Cited

U.S. PATENT DOCUMENTS

| | | | |
|---|---|---|---|
| 2,263,424 A | | 11/1941 | Langer |
| 3,726,180 A | | 4/1973 | Rosan, Sr. |
| 3,752,030 A | | 8/1973 | Steurer |
| 3,918,345 A | * | 11/1975 | Phipard, Jr. ......... F16B 25/0021 411/416 |
| 4,269,902 A | * | 5/1981 | Sygnator ............. F16B 25/0021 428/577 |
| 4,527,932 A | * | 7/1985 | Onasch ............... F16B 25/0015 411/411 |
| 4,561,277 A | * | 12/1985 | Taubert ................. B21H 3/025 470/9 |
| 4,820,098 A | | 4/1989 | Taubert et al. |
| 5,044,855 A | | 9/1991 | Fukubayashi |
| 5,356,253 A | | 10/1994 | Whitesell |
| 5,772,374 A | | 6/1998 | Ide et al. |
| 6,398,786 B1 | * | 6/2002 | Sesic ...................... A61B 17/17 411/411 |
| 2008/0206015 A1 | | 8/2008 | Ambros |
| 2010/0068003 A1 | * | 3/2010 | Wagner ................... B21H 3/02 411/386 |
| 2011/2006938 | | 8/2011 | Ambros |

\* cited by examiner

Fig. 7A
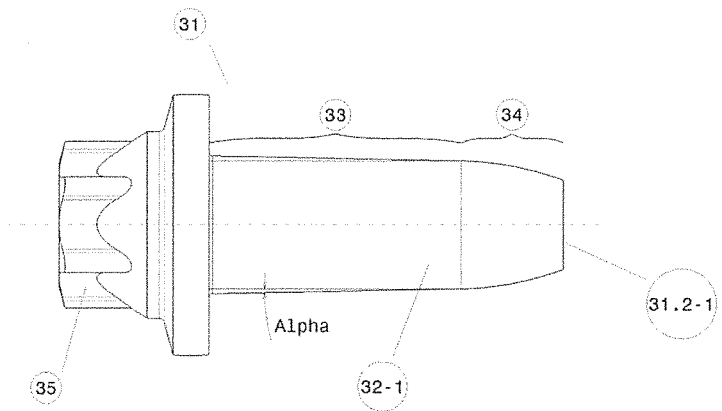
Fig. 7B
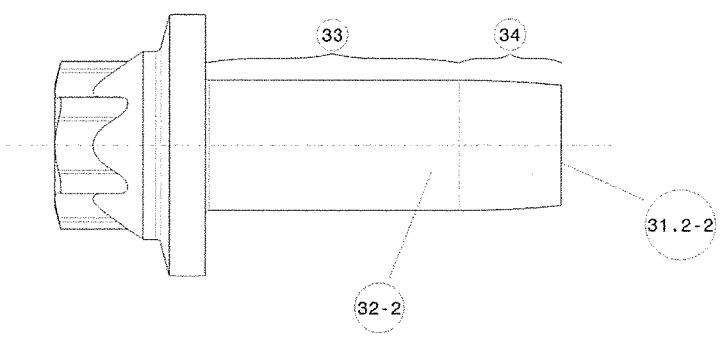
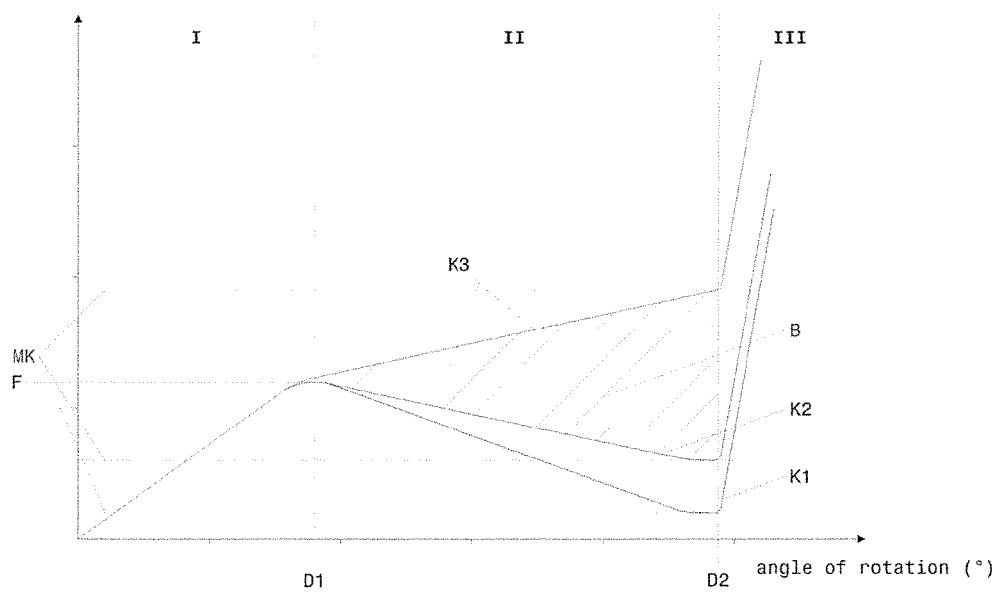
Fig. 8

SELF-TAPPING SCREW AND SCREWED FASTENING AS WELL AS BLANK FOR MANUFACTURING THE SCREW

PRIORITY

This application is a Continuation of commonly assigned and co-pending U.S. patent application Ser. No. 13/877,635, filed Apr. 3, 2013, which claims priority under 35 U.S.C. § 371 to PCT Application PCT/EP2012/062880, filed on Jul. 3, 2012, which claims priority to German Patent Application No. 10 2011 078 686.4, filed on Jul. 5, 2011, the disclosures of which are hereby incorporated by reference in their entireties.

TECHNICAL FIELD

The invention relates to a thread-forming screw comprising a shank provided, at least in part, with a screw thread, and further comprising a screw tip at one end of the shank, wherein the shank comprises a thread-forming portion extending away from the screw tip, a load-bearing portion adjoining the thread-forming portion and comprising a load-bearing screw thread, and optionally further portions adjoining the load-bearing portion, wherein the portion comprising the load-bearing screw thread has a round cross-section, and further relates to a screwed connection comprising said screw, and to a blank for the fabrication of said screw.

The screw can comprise a screw head or a differently shaped screw-driving end for transmitting forces by means of force application surfaces or it can be without a screw head, for example, in the form of a double-threaded bolt or a stud, also referred to as a stud bolt.

PRIOR ART

Most conventional thread-forming screws have the cross-section of a rounded triangle. This geometry, referred to as trilobular, has a positive effect on the torques required for forming the thread, but a screwed connection produced using such a screw can only be made impermeable to liquids or gases by the use of an additional sealant. This method of sealing is possible again only to a very limited extent due to the abrasive action of the thread formed in the accommodating component caused by its elastic recovery reaction directed against the thread flanks of the screw. This applies, in particular, to screwed connections resembling blind holes, in which the thread-forming portion of the screw is still actively engaged in the accommodating component, and in which the application of the sealant in this portion is necessary on account of the extent of thread engagement.

DE 10 2007 010 221 A1 discloses a screw comprising a thread-forming screw thread for creating a metric thread, which screw comprises a thread-forming screw-threaded portion at the screw tip and a load-bearing screw-threaded portion. This reference further discloses that the advantage of a cylindrical thread over trilobular screws is that the screw thread is impermeable to gases and liquids, at least at low pressure differences.

The object of the invention is to provide a thread-forming screw that provides directly screwed connections showing improved impermeability thereof to gases and liquids.

DESCRIPTION OF THE INVENTION

The thread-forming screw of the invention comprises a shank provided, at least in part, with a screw thread, and further comprising a screw tip at that end of the shank that is remote from the screw head. The shank comprises a thread-forming screw-threaded portion extending away from the screw tip and a load-bearing screw-threaded portion adjoining the thread-forming screw-threaded portion, and optionally further portions adjoining the load-bearing screw-threaded portion, wherein the load-bearing screw-threaded portion has a round cross-section. The flank diameter and/or outside diameter of the load-bearing screw-threaded portion increases continuously in the direction extending away from the screw tip and towards the screw head at a gradient of from 1:50 to 1:500 based on the length LG of the load-bearing screw-threaded portion, preferably at a gradient of from 1:100 to 1:400, wherein the increase in the flank diameter DF and/or the outside diameter DA along the length LG of the load-bearing portion is constant.

The conical shape of the fully exploitable load-bearing portion of the screw thread disposed downstream of the thread-forming portion, as viewed in the direction extending towards the screw head, at the gradient specified makes it possible to maintain a sealing contact between the flights in the load-bearing portion of the screw, on the one hand, and the flights formed in the accommodating component, on the other.

This conical shape of the load-bearing screw-threaded portion also counteracts the leveling and smoothing effect of the female flights formed as the extent of screw thread engagement increases and thus maintains a defined clamping effect of the screw or sealing contact between the thread flanks. Thus a thread-forming screw is provided that has a defined degree of frictional retention and an improved sealing function.

This effect can be clearly observed in thread engagement diagrams in that the torque reduction typical of directly screwed connections after the thread-forming portion of the screw has left the accommodating component is reduced or even eliminated altogether so that a distinct clamping effect is apparent.

Furthermore, the conical shape likewise results in an increase in so-called over-torque, that is, the applied torque at which the screwed connection fails mechanically, and this has a positive effect on the usability of, in particular, sheet metal screws.

The build-up of a defined preload force in the thread ensures adequate attachment of the component to be fastened, also referred to as the accommodated component, to the component comprising the screwed connection, also referred to as the accommodating component.

The difference between the forming torque applied when the screw is forming a thread in the accommodating component and the tightening torque for achieving the required preload force is different from that occurring in a conventional thread-forming screwed connection not exhibiting any conical increase in the cross-section of the load-bearing screw-threaded portion, this difference being the result of the constant increase in the cross-section of the load-bearing screw-threaded portion in the screw of the invention, and the resulting conical shape of the load-bearing screw-threaded portion. However, this is not a drawback, since the over-torque in the screwed connection increases to the same extent due to the clamping effect and/or the friction occurring between the female thread and the screw, thus making it possible to achieve higher tightening torques for producing the required preload force.

The screw having the taper gradient proposed by the invention differs significantly from a metric or imperial male thread for self-sealing pipe connections, as known, for example, from DIN 158-1 and DIN 202. The taper gradient of 1:16 used in such cases allows two components that have already been provided with a screw thread to be joined more or less smoothly up to a certain point, after which connection becomes harder to establish until the locking effect finally achieves the sealing effect of the joint without the use of a sealant. A combination of a screw thread of the above type and a screw-forming screw-threaded portion suitable for forming a mating female thread would result, particularly in the case of joints resembling blind holes, in a drastic increase in the tightening torque due to the large taper gradient, which would make it impossible to apply an appropriately high, defined preload force on the accommodated component. Therefore, the taper gradient is selected such that only the loss of elastic recovery reaction of the female thread formed is counteracted, or this effect is slightly enhanced.

The constant taper of the cone has the result that the clamping effect described above remains constant, or is increased with constant application of the sealing contact of the female thread on the screw, along the entire load-bearing screw-threaded portion.

According to an advantageous development of the invention, the thread-forming screw-threaded portion can have a cross-section which differs from that of the load-bearing screw-threaded portion, and is more particularly a trilobular cross-section.

Thus it is possible to combine the advantageous properties of a thread-forming tip having a trilobular cross-section, for example, with the advantages of a load-bearing screw-threaded portion of the invention having a round cross-section, and also to use thread-forming screws comprising thread-forming portions having a trilobular geometry that in themselves do not display a sealing effect for achieving impermeable screwed connections.

Advantageously, the length LG of the load-bearing portion can be at least three times the pitch of the screw thread in the load-bearing screw-threaded portion. The clamping and sealing effect is controlled by the flights of the screw thread, and an adequate sealing effect can still be achieved, all in all, even if any one of the flights is not formed fully due to the flow resistance in the thread formed.

Advantageously, the length of the load-bearing portion can be at least 0.8 times the nominal diameter DN of the screw.

A further object of the invention is the provision of a screwed connection comprising a thread-forming screw and a component comprising an opening for accommodation of said screw. The screw used is designed as described above.

Such screwed connections usually serve the purpose of attaching a component to be fastened, that is, the accommodated component, to the component comprising the screwed connection, that is, the accommodating component. Although, as opposed to oil drain screws or sealing stops having a taper gradient of 1:16, repeated tightening of the screw will reduce or eliminate the sealing effect, such screwed connections are relevant in practice to components that need not be detached once joined together.

A further object of the invention is the provision of a blank for the fabrication of a screw of the kind described above. The blank comprises a subsequently thread-forming portion extending away from a subsequently to be created screw tip and a subsequently to be created load-bearing portion adjoining the thread-forming portion and comprising a subsequently to be created load-bearing screw thread, and optionally further portions subsequently to be created so as to adjoin the load-bearing portion, wherein the blank has a round cross-section in the subsequently to be created load-bearing portion and a conical shape corresponding to the subsequently to be created load-bearing portion.

Thus the blank is already provided with the appropriate conical shape so as to achieve optimum mold filling and the formation of a thread profile showing precise contours in the load-bearing screw-threaded portion corresponding to the predetermined geometry of the rolling tool, as produced in the subsequently to be created rolling process. Thus the external geometry of the blank ideally represents a parallel shift of the geometry of the flank diameter of the subsequently to be created screw thread.

Advantageously, the blank can have a round or a trilobular or a multilobular cross-section in the subsequently to be created thread-forming screw-threaded portion.

BRIEF DESCRIPTION OF THE DRAWINGS

The screw of the invention is described below with reference to the drawings, in which:

FIG. 7A shows a blank for the fabrication of the screw of the invention comprising a tip having a round cross-section;

FIG. 7B shows a blank for the fabrication of the screw of the invention comprising a tip having a trilobular cross-section; and FIG. 8 is a graph comparing the force curves occurring when tightening a screw that is conically shaped and one that is not.

DESCRIPTION OF EMBODIMENT(S) OF THE INVENTION

Figure 1:
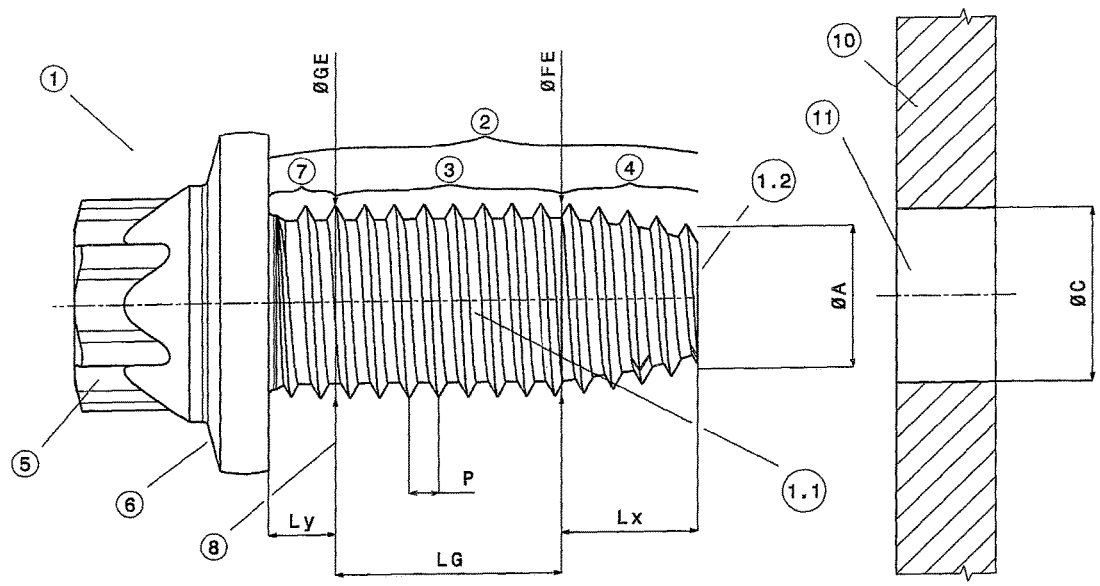
FIG. 1 shows a screw of the invention comprising a thread-forming screw thread and an accommodating component.

A screw 1 comprising a thread-forming thread is shown in FIG. 1. The thread 2 worked into a shank 1.1 comprises a load-bearing screw-threaded portion 3 comprising a screw thread having a round cross-section over a length LG and a screw-threaded portion 4 that adjoins the load-bearing screw-threaded portion 3, tapers to the screw tip 1.2 and serves to form a female thread in an accommodating component 10 and has a length Lx as measured from the screw tip.

At the other end of the screw, there is provided a screw head 5 that comprises a contact surface 6 and that is adjoined by a thread runout 7 of the length Ly of the screw thread 2, which thread runout 7 then merges into the load-bearing screw-threaded portion 3. The flank diameter and/or outside diameter GE of the load-bearing screw-threaded portion 3 is largest at this transition point 8.

The flights of the tapered screw-threaded portion 4 are formed with sharp edges and they contribute to the formation of the female thread when they engage the accommodating component 10. The pitch of the thread in the tapered screw-threaded portion 4 is equal to that of the load-bearing screw-threaded portion 3 but the diameter of the tapered screw-threaded portion 4 decreases continuously in relation to that of the load-bearing screw-threaded portion 3 to a final diameter A that is in turn smaller than a diameter C in the accommodating component 10.

The sharp-edged and fully formed thread in the tapered screw-threaded portion 4 makes it easier to start the screw 1 in the accommodating component 10 and commence formation of the engaged flight than when the thread crest is blunted. The length Lx of the tapered screw-threaded portion 4 is from 0.5 to 1 times the nominal thread diameter DN. This results in a gradient of the length Lx to the pitch of from 4 to 5, preferably 4⅔.

The special feature of the thread 2 is the load-bearing screw-threaded portion 3, the flank diameter or outside diameter of which increases continuously from the screw tip to the head in relation to a strictly metric standard unified thread of constant flank diameter or outside diameter, and the flank diameter or outside diameter FE in the transition zone between the load-bearing screw-threaded portion 3 and the tapered thread-forming screw-threaded portion 4 is smaller than the flank diameter or outside diameter GE in the transition region 8 between the load-bearing screw-threaded portion 3 and the thread runout 7. The flank diameter or outside diameter FE that is equal to the nominal diameter thus increases continuously toward the transition region.

The load-bearing portion 3 exhibits an increase d in its flank diameter DF and/or the outside diameter DA over its length LG in the direction extending away from the screw tip 1.2 at a gradient of from 1:50 to 1:500 based on the length LG of the load-bearing portion, preferably at a gradient DA or DF to LG of from 1:100 to 1:400. The increase in the flank diameter DF and/or the outside diameter DA of the load-bearing portion is constant so that the load-bearing screw-threaded portion widens conically as viewed from the screw tip.

The length LG of the load-bearing portion is a multiple of the pitch p of the screw thread in the load-bearing screw-threaded portion 3.

The screwed connection shown in FIG. 1 comprises the thread-forming screw 1 and an accommodating component 10 comprising an opening 11 for reception of the screw. The core hole diameter C of the opening 11 in the accommodating component 10 is larger than the diameter A of the screw tip 1.2, but smaller than the thread diameter FE in the transition zone of a first screw-threaded portion 4 tapering from the metric screw-threaded portion 3.

The screw 1 of the invention makes it possible to effect non-positive engagement of the screw in the accommodating component 10 that furthermore seals the screwed connection even more reliably by means of a increased positive engagement due to the increase in the diameter of the load-bearing screw-threaded portion than in the case of a screwed connection comprising a self-formed cylindrical thread so that the thread is impermeable to gases and liquids even at relatively high pressure differences.

Figure 2A:
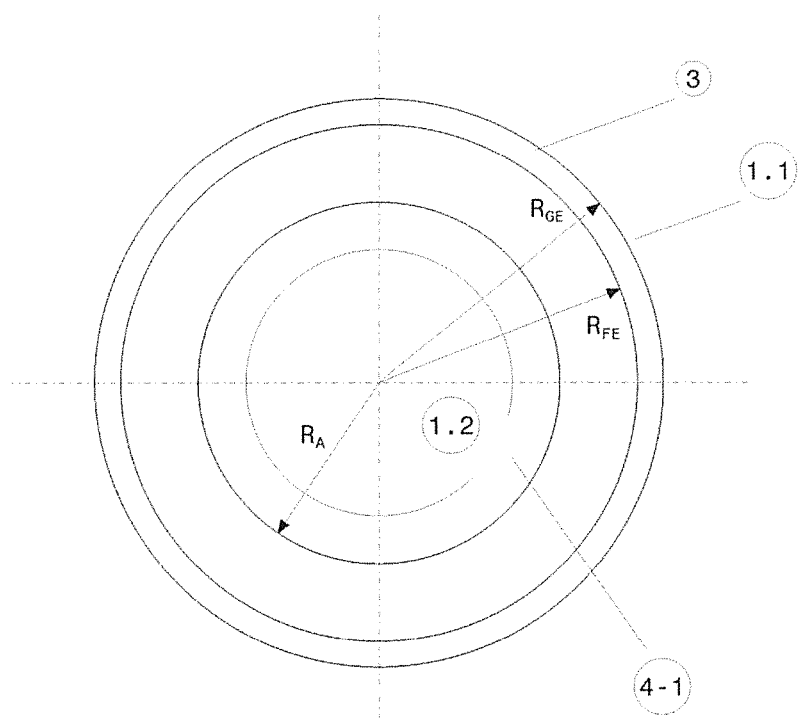
FIG. 2A is a view of a tip of the screw shown in FIG. 1, which tip has a round cross-section.
Figure 2B:
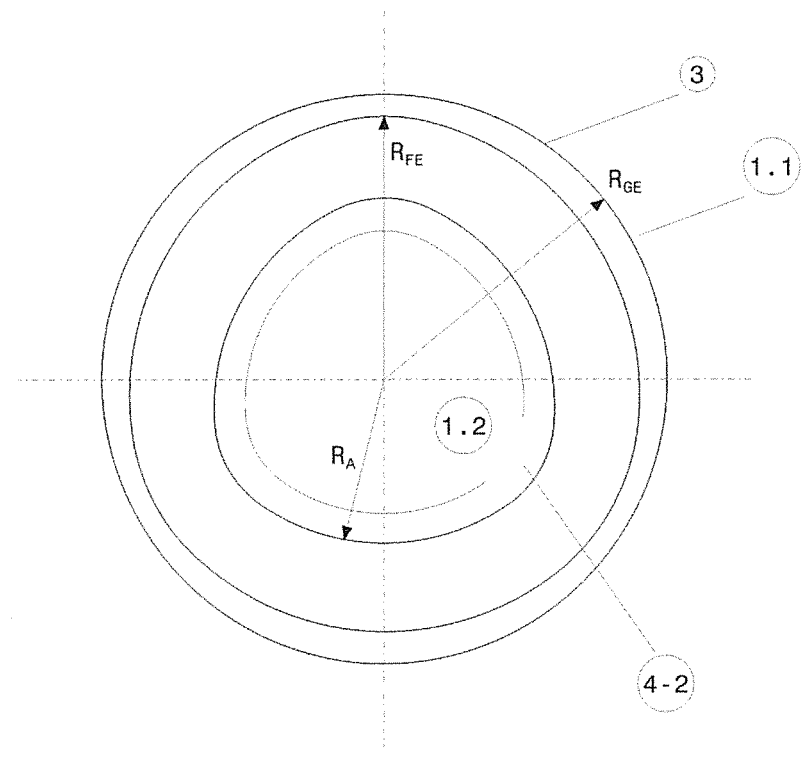
FIG. 2B is a view of a tip of the screw shown in FIG. 1, which tip has a trilobular cross-section.

FIG. 2A shows that the thread-forming portion 4-1 can have a round cross-section proceeding from the tip 1.2 and having a radius RA and extending as far as the round cross-section of the load-bearing screw-threaded portion 3 having a radius RFE, or it can have a different cross-section, in this case a trilobular cross-section as shown at 4-2, as shown in FIG. 2B. The load-bearing screw-threaded portion 3 having a round cross-section increases continuously from a radius RFE to a radius RGE independently of the geometry of the tip 1.2 and that of the thread-forming portion 4.

Figure 3:
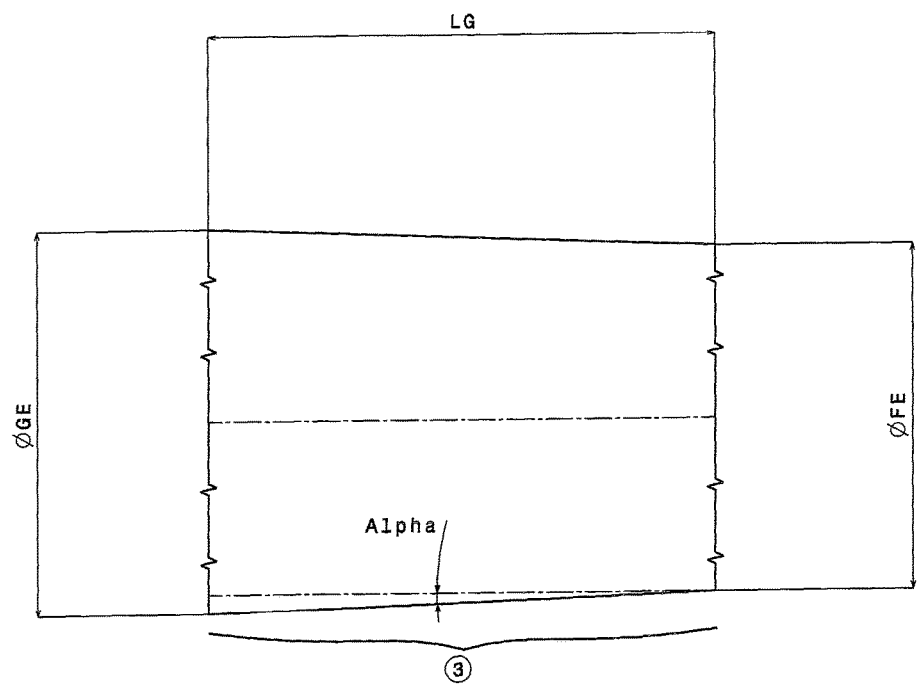
FIG. 3 is a diagrammatic illustration of the load-bearing screw-threaded portion.

FIG. 3 is a diagrammatic illustration of the conical shape of the load-bearing screw-threaded portion 3. Starting from the smaller diameter FE, the diameter increases at a cone angle alpha over the length LG to the diameter GE.

Figure 4:
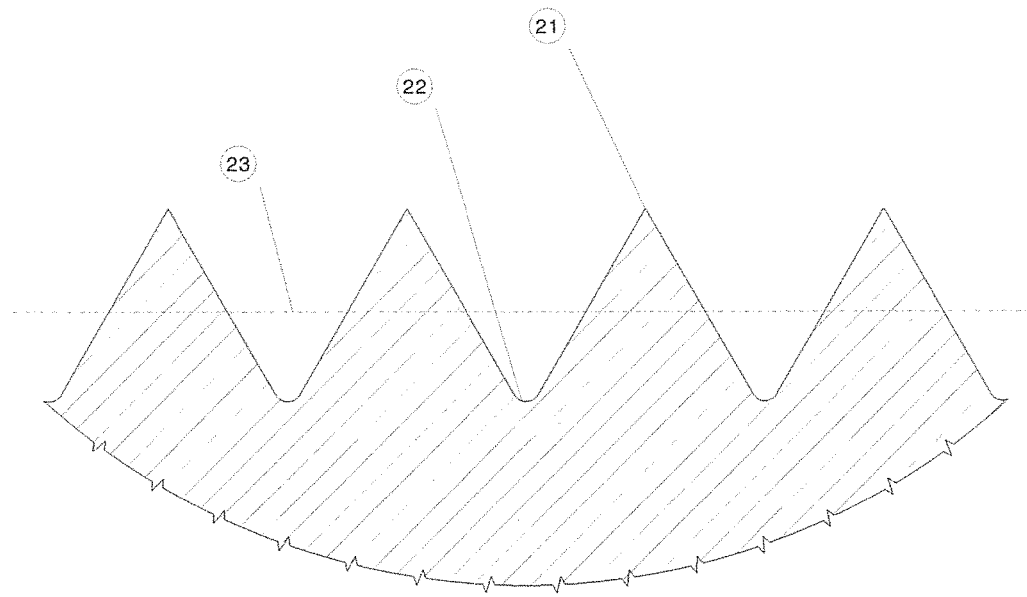
FIG. 4 is a diagram illustrating the thread flanks.
Figure 5:
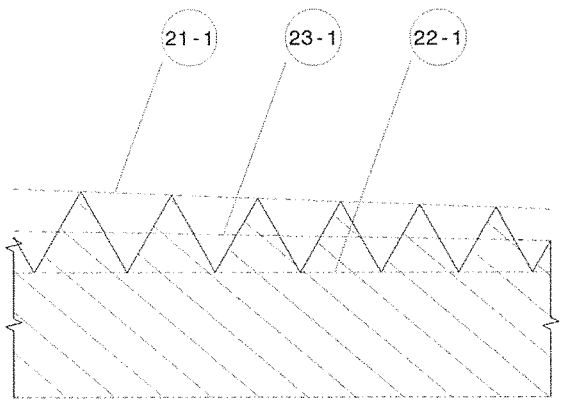
FIG. 5 shows a first embodiment of the load-bearing screw-threaded portion of the screw shown in FIG. 1.
Figure 6:
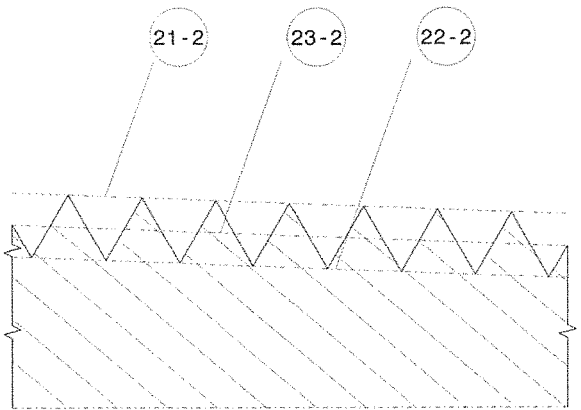
FIG. 6 shows a second embodiment of the load-bearing screw-threaded portion of the screw shown in FIG. 1.

Various embodiments of the screw thread are shown in FIGS. 4 to 6. FIG. 4 shows the basic construction of a single flight comprising a thread crest 21 and a thread root 22, the flank diameter 23 being located precisely therebetween, as shown by the dashed line.

In FIG. 5, the flank diameter 23-1 increases continuously with the diameter of the thread root 22-1 remaining constant, since the diameter of the thread crests 21-1 increases, and thus the thread height, that is, the difference between the thread crest 21-1 and the thread root 22-1, increases.

In FIG. 6, the flank diameter is denoted 23-2, the thread height remains constant, and the diameter of the thread root 22-2 increases at the same cone angle as that of the thread crests 21-2. Since the cone angle is very small, that is, in the range of 0.1°-1.5°, it is possible to produce both types of threads without any noticeable alteration in the appearance of the metric screw.

FIG. 7A shows a blank 31 for the fabrication of a screw, which blank comprises a shank 32-1 comprising a subsequently to be created thread-forming portion 34 extending away from a subsequently to be created screw tip 31.2-1, a subsequently to be created load-bearing screw-threaded portion 33 adjoining the thread-forming portion 34 and comprising a load-bearing screw thread, and optionally additional portions adjoining the subsequently to be created load-bearing screw-threaded portion. The blank 31 has, at least in the subsequently to be created load-bearing screw-threaded portion 33, a round cross-section and a conical shape corresponding to the screw to be produced and having the angle alpha so that the cross-section of the subsequently to be created load-bearing screw-threaded portion 33 increases continuously from the end adjoining the thread-forming portion 34 to the end adjacent to the head 35.

Furthermore, the cross-section of the subsequently to be created thread-forming screw-threaded portion 34 is likewise round in shape and tapers to the tip 31.2-1.

FIG. 7B shows another embodiment of the thread-forming portion 34 of the blank 31, namely, one having a trilobular cross-section likewise tapering towards the screw tip 31.2-2, and a shank 32-2, while the load-bearing screw-threaded portion 33 is designed as shown in FIG. 7A.

The diagram shown in FIG. 8 illustrates the qualitative relationship between the torque and the turning angle of the screw when tightening the screw in the form of a directly screwed connection in a through hole of an accommodating component without intrinsic flights. The torque is given in Nm, the turning angle is given in degrees and is also equal to one tap depth in the case of a directly screwed connection.

The figure shows three curves K1, K2, K3, of which the lowermost curve K1 corresponds to a commercially available thread-forming screw and the curves K2 and K3 located above the lowermost curve K1 correspond to a thread-forming screw of the invention comprising a conically formed load-bearing screw-threaded portion. The curve K2 is distinguished from the curve K3 by the cone angle of the conically formed load-bearing screw-threaded portion, the cone angle of the curve K3 being larger than that of the curve K2. The required self-retention of the screwed connection depending on its application can be effected by the selection of a suitable cone angle for the screw, which is illustrated by the hatched region B, which shows a field of various cone angles and the associated curve, the region B being delimited by the curves K2, K3.

The three curves K1, K2 and K3 are each divided into three sections I, II, and III, as plotted against the turning angle of the screw. The characteristic of the forming torque is shown in the first portion I and all three curves K1, K2, and K3 are disposed one above the other and exhibit, in this case, a substantially linear increase in torque from the initial engagement of the thread-forming portion to the point at which the maximum forming torque F is attained on reaching the largest thread diameter of the thread-forming portion. The maximum forming torque F is reached at a turning angle D1. When the screw is tightened, there takes place a plastic and elastic deformation of the accommodating component with flights being formed in the accommodating component. The torque increase itself depends on the geometry of the thread-forming portion and can deviate from the linear course. The forming torques of a round thread-forming portion and a trilobular thread-forming portion also differ from each other with the latter usually being lower. For reasons of comparability, the thread-forming portions of the screws for which the curves K1-K3 are relevant are of identical shape.

In the adjoining section II, the thread-forming portion has passed through the through hole in the accommodating component and, as the turning angle increases further, there takes place a plastic deformation of the thread formed in the accommodating component which may be regarded as a smoothing effect. As soon as the smoothing effect is accomplished, which is the case before a turning angle D2 is reached, there remains only the clamping torque MK generated by the elastic recovery reaction of the deformed female thread, and this clamping torque MK results in a clamping effect or self-retention of the screw. It is clear that the clamping torque of the curve K1 corresponding to a commercially available thread-forming screw is lower than the clamping torque of the thread-forming screws of the invention comprising a conically formed load-bearing screw-threaded portion, while the clamping torque of the curve K2 is higher than that of the curve K1 but lower than the clamping torque of the curve K3 and still lower than the maximum thread-forming torque F. However, the clamping torque of the curve K3 is higher than the maximum thread-forming torque F.

In the case of a small cone angle, the smoothing effect of the flights formed in the accommodating component as the turning angle increases, that is, with further tightening of the screw, is compensated, at least in part, by the increase in cross-section. In the case of a larger cone angle, there will additionally take place displacement of material and thus a further increase in the clamping effect and the clamping torque.

The flights of the female thread in the accommodating component bear positively against the flights of the thread-forming screw to provide a sealing effect that is a distinct clearly improvement on the commercially available thread-forming screws.

In section III, further tightening of the screw after a turning angle D2 has been reached, results in the screw head coming to bear against the accommodating component or an accommodated component located therebetween, which results in locking of the screw. When the turning angle increases beyond this point, the accommodating component usually breaks down and the screw damages the female thread. The curves K1, K2, and K3 thus end in section III when the screwed connection fails on reaching over-torque, also referred to as torque at failure. The ends of the curves K1, K2, and K3 are located one above the other, that is to say, the over-torque of the screwed connection also increases as the cone angle increases.

The invention claimed is:

1. A blank for the fabrication of a screw comprising, at least in part, a shaft provided with a screw thread and further comprising a screw tip at one end of the shaft, wherein the shaft comprises a thread-forming screw-threaded portion that extends away from the screw tip and an adjoining load-bearing screw-threaded portion, wherein the load-bearing screw-threaded portion has a round cross-section, wherein the load-bearing screw-threaded portion includes, in a direction away from the screw tip, an increase in at least one of a flank diameter DF or an outside diameter DA of the screw thread at a gradient of approximately 1:50 to 1:500 based on a length LG of the load-bearing screw-threaded portion, wherein the increase in the at least one of the flank diameter DF or the outside diameter DA remains constant over the length LG of the load-bearing portion, the blank comprising:
a subsequently to be created thread-forming screw-threaded portion extending away from a subsequently to be created screw tip and an adjoining subsequently to be created load-bearing screw-threaded portion having a load-bearing screw thread to be formed from the blank and other regions to be subsequently formed so as to adjoin the load-bearing portion, wherein the blank has a round cross-section in the subsequently to be created load-bearing screw-threaded portion and a conical shape corresponding to the subsequently to be created load-bearing screw-threaded portion, and wherein the blank includes, for the subsequently to be created load-bearing screw-threaded portion, a cone angle of between 0.1°-0.5° that provides a maximum diameter adjacent to a subsequently to be created screw head and a minimum diameter adjacent to the subsequently to be created thread-forming screw-threaded portion.

2. The blank according to claim 1, wherein the blank has a round or trilobular cross-section in the subsequently to be created thread-forming screw-threaded portion.

3. The blank according to claim 1, wherein the screw comprises the thread-forming screw-threaded portion including a trilobular cross-section.

4. The blank according to claim 1, wherein the screw comprises the gradient DA or DF to LG of approximately 1:400.

5. The blank according to claim 1, wherein the screw comprises the thread-forming screw-threaded portion including a cross-section deviating from the cross-section of the load-bearing screw-threaded portion.

6. The blank according to claim 5, wherein the screw comprises the length LG of the load-bearing screw-threaded portion that is equal to at least three times a pitch of the screw thread in the load-bearing screw-threaded portion.

7. The blank according to claim 6, wherein the screw comprises the length LG of the load-bearing screw-threaded portion that is equal to at least approximately 0.8 times a nominal diameter DN of the screw.

* * * * *